United States Patent
Fukuda

[15] 3,641,903
[45] Feb. 15, 1972

[54] EXPOSURE CONTROL DEVICE FOR FLASHLIGHT EQUIPPED CAMERA

[72] Inventor: Susmu Fukuda, Nishinomiya-shi, Japan
[73] Assignee: Fuji Photo Film Co., Ltd., Kanagawa, Japan
[22] Filed: Oct. 28, 1969
[21] Appl. No.: 870,031

[30] Foreign Application Priority Data
Nov. 27, 1968 Japan....................................43/86820

[52] U.S. Cl..........................................95/64 A, 95/10 C
[51] Int. Cl..............................................G03b 7/16
[58] Field of Search...........................95/10 C, 64 R, 64 A

[56] References Cited
UNITED STATES PATENTS

| | | | |
|---|---|---|---|
| 3,443,496 | 5/1969 | Sauer et al. | 95/64 A X |
| 3,464,333 | 9/1969 | Aoki et al. | 95/10 C |
| 3,492,928 | 2/1970 | Kitai | 95/64 A X |
| 3,515,047 | 6/1970 | Hahn | 95/64 A X |
| 3,529,524 | 9/1970 | Veda | 95/64 A X |

*Primary Examiner*—Joseph F. Peters
*Attorney*—Sughrue, Rothwell, Mion, Zinn & Macpeak

[57] ABSTRACT

A camera for taking pictures with the aid of a flashlight carries a member coupled to the exposure meter indicator for moving a control lever which changes the lens aperture of the camera in accordance with the brightness of the object being photographed.

6 Claims, 1 Drawing Figure

PATENTED FEB 15 1972
3,641,903
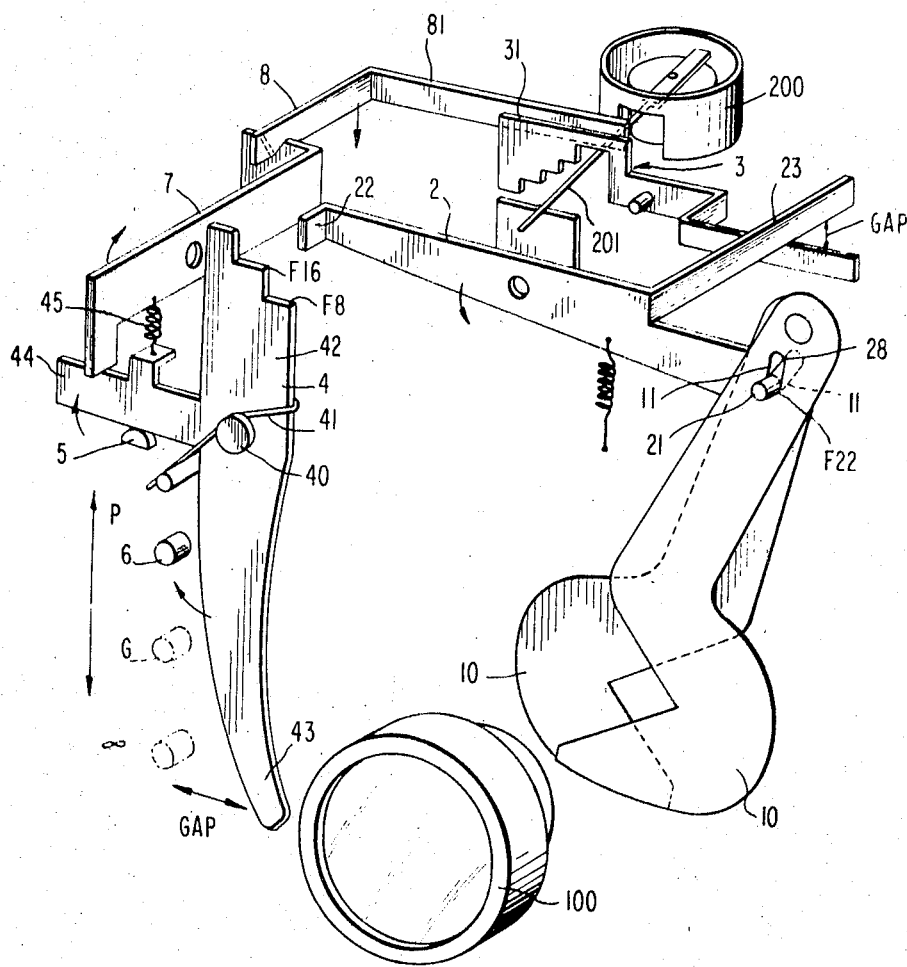
INVENTOR
SUSUMU FUKUDA
BY Sughrue, Rothwell, Mion, Zinn & Macpeak
ATTORNEYS

EXPOSURE CONTROL DEVICE FOR FLASHLIGHT EQUIPPED CAMERA

BACKGROUND OF THE INVENTION

1. Field of the Invention

This invention relates to the novel exposure control device for controlling the size of the lens aperture of the camera under flashlight conditions and more particularly to an exposure control device which controls the size of the lens aperture in accordance with the distance between the camera and the object being photographed.

2. Description of the Prior Art

In conventional automatic exposure controlling cameras employing electric photoconductors, film exposure is automatically controlled only when the brightness of the object being photographed is above a predetermined minimum value. Where the brightness is insufficient for the photoconductor to automatically control the exposure, the exposure of the film must be controlled manually.

SUMMARY OF THE INVENTION

The present invention provides an exposure control device for a camera, particularly an automatic exposure controlling camera in which the exposure is automatically controlled even where the object being photographed is so dark that it requires additional illumination such as by a flashlight. Briefly, the invention is directed to a control unit operatively coupled to means for controlling the size of the lens aperture of the camera with a further member operatively coupled to an exposure meter movable indicator for moving the control lever in accordance with the brightness of the object being photographed.

BRIEF DESCRIPTION OF THE DRAWING

The single FIGURE is a perspective view of one embodiment of the exposure control device in accordance with the present invention as applied to a conventional photographic camera.

DESCRIPTION OF THE PREFERRED EMBODIMENT

Referring to the drawing, a control lever 2 is of T-shaped configuration and is pivotally disposed within the camera body (not shown) for controlling the size of the lens aperture of the camera. The control lever 2 is provided at one end with a pin 21 which engages slots 11 of respective diaphragm blades 10 arranged in a lens system 100. The pair of diaphragm blades 10 are pivotally mounted at one end, in this case positioned to pivot about an axis just above pin 21. The other end of the T-shaped control lever 2 terminates in a slightly bent portion 22 which is selectively brought into engagement with the stepped end 42 of control member 4 when the illumination on the object is insufficient for photographing the same without operating the flashlight associated with the camera. In this respect, the stem portion 23 of the control lever 2 is so positioned that it moves into engagement with member 3 to achieve automatic exposure control in the absence of energization of the flashlight. To provide this dual, automatic control, a gap is provided between the stem portion 23 and member 3 as indicated in the drawing. In the embodiment illustrated in the drawing, the size of the lens aperture is determined by the pair of diaphragm blades 10, and increases in response to the counterclockwise rotation of the T-shaped lever 2. The T-shaped lever is mounted for rotation intermediate of its ends and movable counterclockwise as shown by the arrow. The size of the lens aperture, of course, decreases under clockwise rotation of the same element.

When the camera operates in the range of the ordinary automatic exposure, the member 3 moves up and down (in response to means not shown) to sense needle 201 of an exposure meter 200 and to position the lever 2 and to thereby control the size of the lens aperture by opening and closing the two blades 10 to provide the correct exposure of the film (not shown).

The control member 4 is pivotally mounted by means of pivot pin 40 and is biased to rotate counter clockwise about the pin 40 by means of spring 41. The control member 4 operates only when the brightness of the object being photographed is so dark that flash lighting is required. As mentioned previously, the upper end 42 of the control member 4 is stepped while the lower portion 43 is slightly curved. The member 4 is further provided with a laterally extending branch portion 44. The stepped end 42 of the control member is normally located out of the range of movement of the right angle bent portion 22 of control lever 2. Control member 4 is prevented from rotating counterclockwise by means of stop 5 which is so positioned as to be in contact with the lower edge of the branch portion 44. Clockwise rotation of control member 4 is limited by a movable pin 6 which varies its position with respect to pivotable control member 4 in accordance with he the between the camera and the object. A lever 7 is pivoted about its center and so disposed such that one end is in contact with the upper edge of the branch portion 44, beyond stop 5. The other end of lever 7 is in contact with the flashlight switching member 8. One end 81 of the flashlight switching member 8 is associated with the exposure meter 200 to sense its needle 201 in such a manner that the switching member 8 moves downwardly as indicated by the arrow in response to an indication of the exposure meter that the brightness of the object being photographed is too dark to provide the desired exposure without additional lighting such as by the flashlight. The arrangement for causing the switching lever is to move downwardly is constructed quite easily in accordance with prior art teachings, e.g., the member 8 may be connected directly to the pointer of an exposure meter such that the member moves downwardly in response to movement of the pointer when the pointer moves out of the definite range (where the camera has the ability to take the picture without the necessity for additional illumination). When the switching member 8 moves downwardly, the lever 7 is pivoted clockwise as shown by the arrow whereby, control member 4 rotates clockwise under the bias of spring 41.

Thus, the control member 4 moves into engagement with control lever 2 to control movement of the same when the objecting being photographed is so dark that it requires auxiliary illumination as from a flashlight. Where the control member 4 rotates clockwise through only a small angle, the bent portion 22 of control lever 2 moves into engagement with the stepped end 42 of the control member. The extent of the inclination or rotation of control member 4 is determined by the position of pin 6 which changes depending upon the distance between the camera and the object being photographed. Thus, the bent portion 22 of lever 2 may be brought into engagement with different stepped surfaces of the stepped end 42 of control member 4, in accordance with the distance between the object being photographed and the camera. In this respect, the pin 6 may be connected directly to a distance adjustment ring (not shown) carried by the camera. In the drawing, the mark P indicates the position of pin 6 for taking portrait pictures, the position G in dotted lines indicates the position of pin 6 when taking group pictures. The dotted line position of the pin 6 identified as infinity ($\infty$) is employed when taking pictures where the object is at extremely long range. The distance adjustment ring (not shown) may be operated either manually or automatically. Correspondingly, in the embodiment shown in the drawing, the lower step F8 corresponds to position P, the central step F16 corresponds to the intermediate position G for the pin and the highest step corresponds to the infinity pin position.

For flashlight photography, switching member 8 moves down to an extent causing lever 7 and control member 4 to rotate clockwise while member 3 moves up so as to move into contact with the lower edge of step portion 23 of lever 2. Therefore, when the member 3 begins to move lever 2, the bent portion 22 of lever 2 is brought into engagement with the stepped end 42 of control member 4. By engagement of the bent portion 42 of the control lever 2 with stepped portion 42 of the control member 4, the size of the lens aperture is thus determined. The camera can be so arranged that energization of the flashlight (carried by the camera or separately) may be achieved only at the moment when the shutter is operated and only when the control member 4 is inclined to the extent that it engages the bent portion 22 of the control lever 2 by an arrangement in which either the control member 4 or lever 7 is coupled to the flashlight operation means. Thus, the flashlight may be automatically operated and a correct exposure may be obtained when the object requires a flashlight as auxiliary illumination because of the darkness of the object being photographed.

It is not always necessary that the lower portion of the control member be curved. If desired, the lower portion 43 of the control member 4 may be straight, and pin 6 moves along a straight line path. In this case, the shape of the lower portion of the control member 4 depends upon the shape of the path of movement of pin 6 between positions P, G and infinity.

What is claimed is:

1. In a camera including an exposure meter, a lens system, lens aperture controlling means, a control lever coupled to said lens aperture controlling means, and means for normally operating said control lever automatically in response to illumination of the object being photographed, the improvement comprising: an exposure meter, a control member pivotably mounted and movable between a first position and a second position wherein, at said second position, a stepped end of said control member engages said control lever, means for biasing said control member into engaging position with said control lever, a lever coupled to said exposure meter operated member of normally preventing said control member from pivoting into engagement with said control lever, and a member operatively coupled to said exposure meter for moving said control member to said second position to cause said control lever to modify the position of said lens aperture controlling means independently of said first control means.

2. The camera as claimed in claim 1 further comprising a movable pin positioned in the path of movement of said control member for determining which step of said control member engages one end of said control lever, and means for variably positioning said pin at positions corresponding to the distance from the camera to the object being photographed.

3. The camera as claimed in claim 2 wherein said lens aperture control means comprises a pair of pivoted diaphragm blades, said control lever is T-shaped in configuration and is pivoted intermediate of its ends, one end of said control lever includes a pin and slot means for engagement with said diaphragm blades for controlling movement of the same about the diaphragm blade pivot axis, said first control means comprises a member movable into engagement with said control means between said lever pivot axis and said pin and slot means, whereby engagement between the end of said control member and the other end of said control lever modifies movement of said diaphragm under operation of said first control means.

4. The camera as claimed in claim 1 wherein said control member includes a lateral extension in contact with the fixed stop for limiting movement of said control member out of the path of said control lever, and said camera further includes a pivoted lever operatively coupling said exposure meter coupled member to said control member and normally operating to prevent movement of said member into contact with the end of said control lever, said exposure coupled member adapted to pivot said lever to allow selective engagement between said control member and the end of said control lever opposite that coupled to said diaphragm blades.

5. The camera as claimed in claim 4 wherein the end of said control member engaging said control lever is stepped, and said camera further includes a pin movable in accordance with the distance from the camera to the object being photographed to control the extent of movement of said control member upon release by said pivotable lever to determine which step the end of said control lever engages.

6. The camera as claimed in claim 5 further including a flashlight-operating member and means responsive to pivoting of said pivotable lever under action of said exposure meter control member for actuating said flashlight-operating member.

* * * * *